United States Patent [19]

Sakashita

[11] Patent Number: 4,939,975

[45] Date of Patent: Jul. 10, 1990

[54] ELECTRONIC MUSICAL INSTRUMENT WITH PITCH ALTERATION FUNCTION

[75] Inventor: Shigeo Sakashita, Hamura, Japan

[73] Assignee: Casio Computer Co., Ltd., Tokyo, Japan

[21] Appl. No.: 301,247

[22] Filed: Jan. 24, 1989

[30] Foreign Application Priority Data

Jan. 30, 1988 [JP] Japan .......................... 63-11474[U]

[51] Int. Cl.[5] .................... G09B 15/04; G10H 1/053; G10H 7/00

[52] U.S. Cl. .................................. 84/626; 84/709; 84/737; 84/477 R

[58] Field of Search .......................... 84/1.01, 1.03 84/1.19, 626-633, 622-665, 701-711, 737-741, 477 R, 478

[56] References Cited

U.S. PATENT DOCUMENTS 3,767,833 10/1973 Noble et al. .

3,881,387 5/1975 Kawakami .......................... 84/1.24

3,999,458 12/1976 Suzuki .......................... 84/1.01

4,050,343 9/1977 Moog .......................... 84/1.01

4,203,338 5/1980 Vidas .......................... 84/1.14

4,704,682 11/1987 Clynes .......................... 84/1.24 X

*Primary Examiner*—Stanley J. Witkowski

*Attorney, Agent, or Firm*—Frishauf, Holtz, Goodman & Woodward

[57] ABSTRACT

The present electronic musical instrument can apply to various electronic musical instruments, such as an electronic wind instrument, electronic keyboard instrument and electronic string instrument. Pitch alteration width data with a predetermined pitch difference with respect to a tone being presently generated is stored in advance in a memory section, and by alternately performing the following two operations thereby to ensure a trill performance with a pitch having an arbitrary pitch alteration width by a simple pitch alteration operation. (1) A predetermined musical tone is generated at the presently-designated pitch by the pitch designation operation executed with respect to a pitch designating section. (2) A predetermined musical tone is generated at a pitch higher or lower than the presently-designated pitch, in accordance with the pitch alteration width data, by the pitch alteration designating operation executed with respect to a pitch alteration designating section.

14 Claims, 3 Drawing Sheets

ELECTRONIC MUSICAL INSTRUMENT WITH PITCH ALTERATION FUNCTION

BACKGROUND OF THE INVENTION

1. Field of the Invention

The present invention relates to an electronic musical instrument with a pitch alteration function which permits alteration of a pitch specified by a pitch designating operation to another pitch in accordance with preset pitch alteration width data. More particularly, this invention relates to an electronic musical instrument with a pitch alteration function suitable for playing a trill performance.

2. Description of the Related Art

An electronic musical instrument has been known which permits a musical performance by alternately specifying a pitch designated by a pitch designating operation through a keyboard and a pitch altered by operation of a half-tone trill key or a full-tone trill key (i.e., the pitch half tone or full tone higher than the former pitch).

According to such an electronic musical instrument, however, a possible trill performance is limited to such an extent that the pitch designated by a pitch designating operation through the keyboard is changed to another pitch, a half pitch or a full pitch higher, by operation of the half-tone trill key or full-tone trill key provided in advance. The width of pitch alteration that can be changed by operation of each trill key is simply a half tone or full tone length. As a solution to this restriction, it has been proposed to provide a 1.5-tone trill key, a two-tone trill key, etc. in addition to the mentioned, original two trill keys. An increase in the quantity of trill keys with different pitch alteration widths not only increases the manufacturing cost accordingly, but also complicates the pitch altering operation as the proper trill key should be operated in accordance with the desired pitch alteration width.

SUMMARY OF THE INVENTION

Accordingly, it is an object of this invention to provide an electronic musical instrument which ensures a trill performance while altering a present pitch to a new one with an arbitrary pitch alteration width by a simple pitch changing operation.

It is another object of this invention to provide an electronic musical instrument which permits a user to arbitrarily preset an alteration width of a pitch to be altered.

It is a further object of this invention to provide an electronic musical instrument in which when a pitch designating operation is performed on pitch designating means, a musical tone is generated at the pitch designated by this operation, and when a pitch altering operation is performed on pitch alteration designating means under the condition that a given pitch is designated by the pitch designating operation, a musical tone is generated at the pitch higher or lower by a preset pitch alteration width than the designated pitch.

It is a still another object of this invention to provide an electronic musical instrument in which when a play input operation is performed on play input means under the condition that a given pitch is designated by the operation of pitch designating means, a musical tone is generated at the pitch currently designated by this operation, and when a pitch altering operation is performed on pitch alteration designating means under the condition that the play input operation is carried out, a musical tone is generated at the pitch higher or lower by a preset pitch alteration width than the currently designated pitch.

It is a still further object of this invention to provide an electronic musical instrument which can display pitch alteration width data corresponding to the pitch alteration width arbitrarily designated by pitch alteration width designating means.

According to one aspect of this invention, there is provided an electronic musical instrument comprising:

pitch designating means for permitting designation of a pitch designated by a pitch designating operation;

pitch alteration designating means for designating alteration of a pitch designated by the pitch designating means;

pitch alteration width designating means for permitting arbitrary designation of an alteration width of a pitch to be altered by the pitch alteration designating means;

pitch alteration width memory means for storing pitch alteration width data designated by the pitch alteration width designating means; and pitch alteration control means for, when pitch alteration is designated by the pitch alteration designating means under a condition that a predetermined pitch is designated by the pitch designating means, executing such a control that the pitch designated by the pitch designating means is altered to another corresponding pitch in accordance with the pitch alteration width data stored in the pitch alteration width memory means.

DETAILED DESCRIPTION OF THE PREFERRED EMBODIMENT

A preferred embodiment of this invention as applied to an electronic wind instrument will now be described referring to the accompanying drawings.

STRUCTURE

Figure 1:
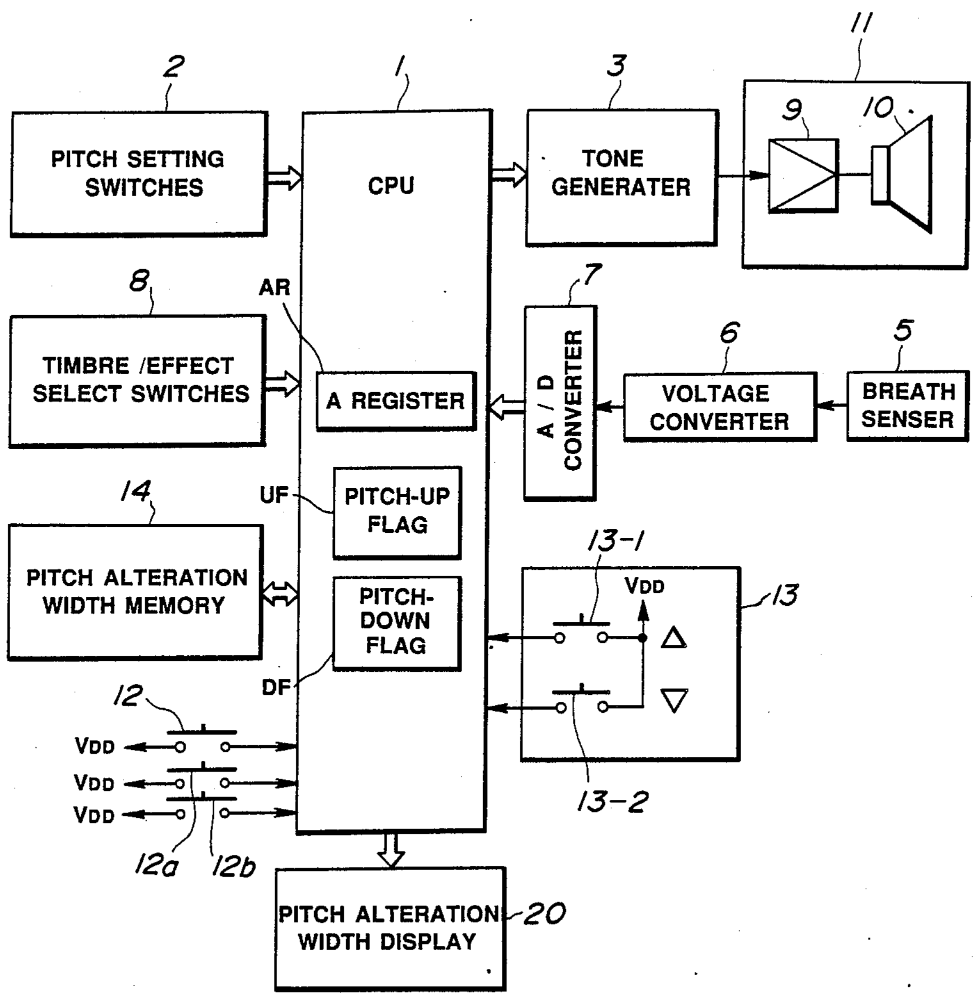
FIG. 1 is a general circuit diagram illustrating this invention as applied to an electronic wind instrument.

FIG. 1 is a general circuit diagram of an electronic wind instrument embodying this invention.

A CPU (central processing unit) 1, constituted by a microprocessor, receives predetermined pitch data designated by pitch designating operation on pitch setting switches 2 that constitute pitch designating means, and outputs this pitch data to a tone generator 3.

Breath data detected by a breath sensor 5 based on a play input operation through a mouth section 4 of a wind instrument main body is first converted into a corresponding voltage value in an voltage converter 6, and this voltage value is further converted into a corresponding digital value by an A/D converter 7. The digital breath data is sent to the CPU 1 which in turn sends out the data to the tone generator 3 as tone control data, such as tone generating designation data or tone volume control data.

Further, the CPU 1 receives timbre/effect data selected by timbre/effect select switches 8 and sends the data to the tone generator 3. A musical tone produced by the tone generator 3 is input to a tone output device 11 which comprises an amplifier 9 and a loud-speaker 10. The tone input to the tone output device 11 is amplified by the amplifier 9 and is generated as a musical tone through the speaker 10.

When a pitch alter switch 12 constituting pitch alteration designating means is activated, the CPU 1 is applied with a predetermined voltage signal $V_{DD}$ for instructing pitch alteration in response to the activation.

When a pitch-up switch 13-1 or a pitch-down switch 13-2 in a pitch alteration width setting switch section 13, which constitutes pitch alteration width setting means, is operated, the CPU 1 is applied with a predetermined voltage signal VDD for instructing an increase or decrease in pitch in response to the switch operation. Pitch alteration width data corresponding to a pitch alteration width set by this pitch alteration width setting switch section 13 is stored, under the control of the CPU 1, into a pitch alteration width memory 14 (hereinafter referred to as RAM 14), such as a RAM (random access memory), a magnetic tape or a magnetic disk, which serves as pitch alteration width memory means. The pitch alteration width data stored in this RAM 14 is read out therefrom in response to activation of the pitch alter switch 12.

A pitch alteration width display 20, coupled to the CPU 1, displays the pitch alteration width data currently stored in the RAM 14 or pitch alteration width data which is now being set by the pitch alteration width setting switch section 13.

Figure 2:
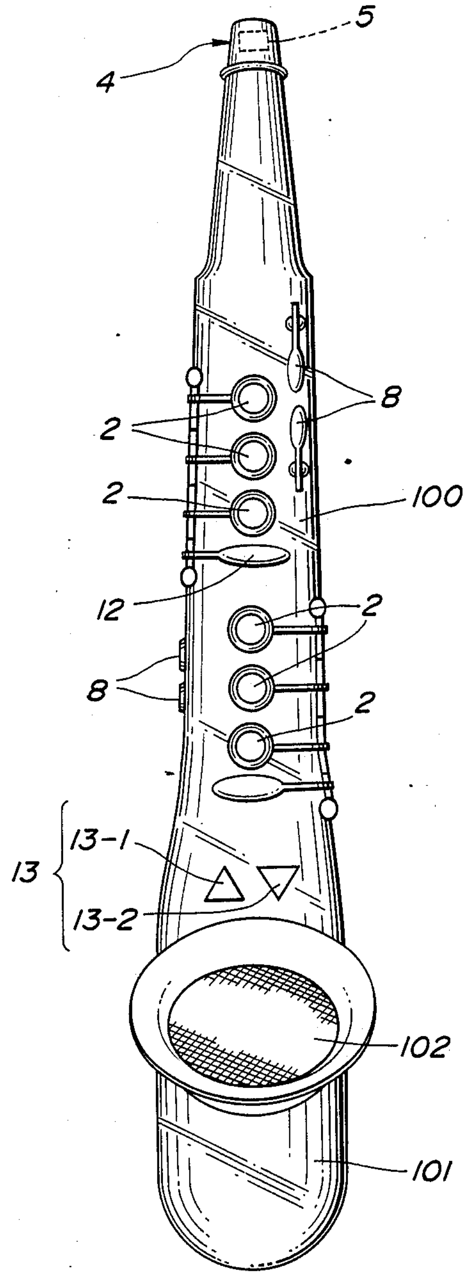
FIG. 2 is a plan view of the electronic wind

FIG. 2 illustrates the exterior of the electronic wind instrument shown in FIG. 1; those given the same reference numerals as used in FIG. 1 have the identical functions of the corresponding sections in FIG. 1.

The breath sensor 5 for detecting a breath operation state is provided in the mouth section 4 located at one end of the wind instrument main body 100 of a saxophone shape. The main body 100 is provided thereon with a plurality of pitch setting switches 2 for designating the pitch of a musical tone to be generated, timbre/effect select switches 8 for adding a predetermined timbre or effect, pitch alteration width setting switch section 13 used to set a pitch alteration width, and pitch alter switch 12 used to change the pitch designated by the switches 2 to another pitch in accordance with predetermined pitch alteration width data. In the wind instrument main body 100 are the CPU 1, tone generator 3, A/D converter 7, etc. The speaker 10 is provided in a phone section 101 located at the bottom section of the main body 100. A tone generating section 102 for surely generating a musical tone from the speaker 10 is provided at the opening section of the phone section 101.

OPERATION

Figure 3:
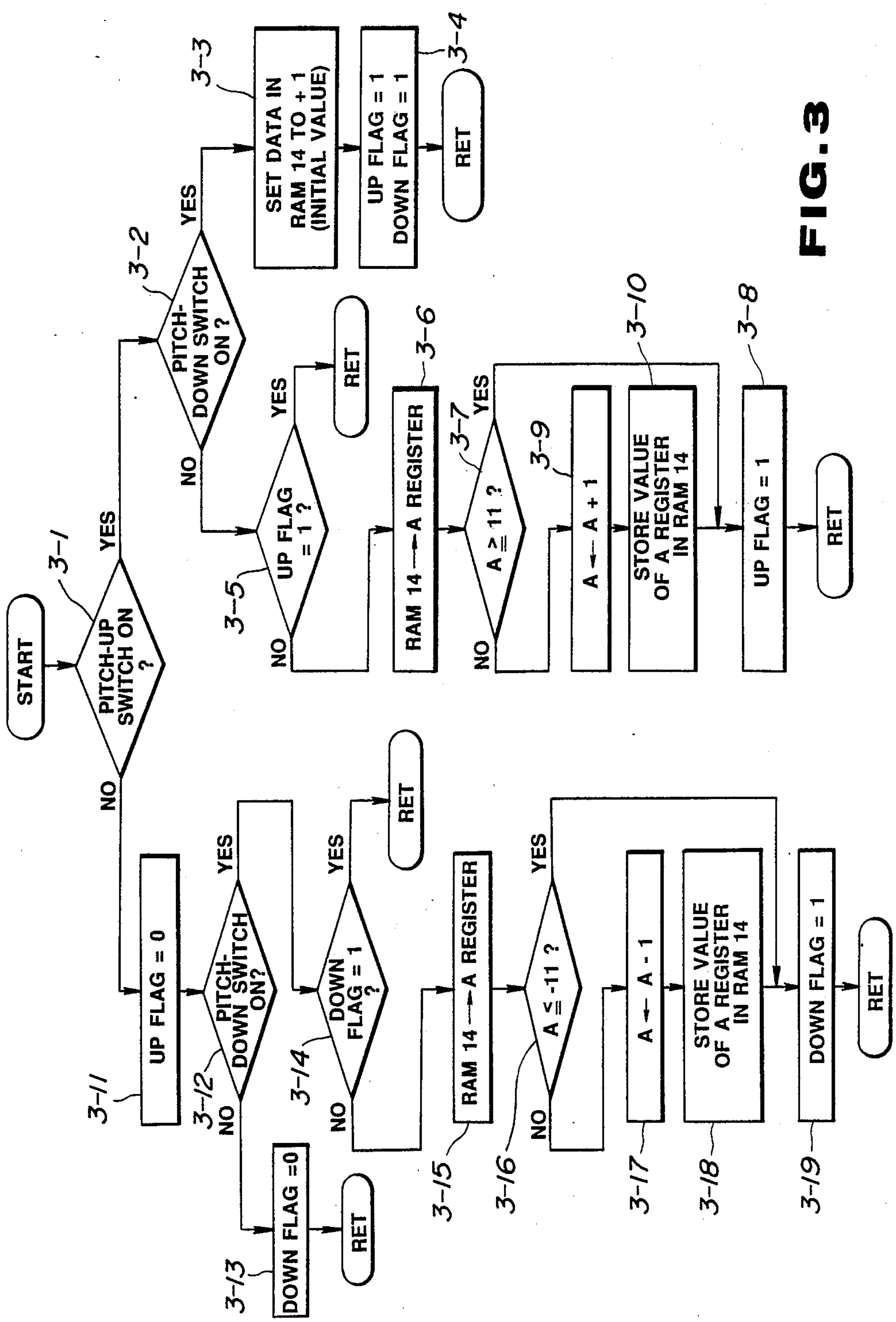
FIG. 3 is a flowchart for setting a pitch alteration width.

The operation of the present instrument will now be described referring to the flowchart for setting a pitch alteration width, as shown in FIG. 3.

The sequential operation shown in FIG. 3 is repeated for every predetermined time interval with respect to the flow of the main routine (not shown) of the CPU 1.

First, in step 3-1, it is discriminated whether or not the pitch-up switch 13-1 of the switch section 13 is turned on. If YES, it is then discriminated in the next step 3-2 whether or not the pitch-down switch 13-2 is also turned on. If the decision is YES, which means that both of the switches 13-1 and 13-2 are turned on, the content of the RAM 14 is initialized. That is, this case is considered as executing the most typical trill performance with a half tone up, and +1 is written as initial data in the RAM 14 in step 3-3. Given that the half tone difference is "1," "+1" indicates increasing the pitch by a half tone while "−1" indicates reducing the pitch by a half tone.

In step 3-4, to specify that both of the pitch-up switch 13-1 and pitch-down switch 13-2 are turned on, a pitch-up flag UF and a pitch-down flag DF are both set to "1" before the flow returns to the main routine.

If the decision in step 3-2 is NO, which means that the pitch-down switch 13-2 is not currently ON, it is discriminated in step 3-5 whether or not the pitch-up flag UF is presently set to "1." If YES, it means that switch 13-1 is not newly turned on but has data in the RAM 14 to alter the pitch alteration width and the flow returns to the main routine. If the decision in step 3-5 is NO, it means that only the pitch-up switch 13-1 is newly turned on, so that the flow advances to execute a process for storing new pitch alteration width data in the RAM 14 for conducting a trill performance. The following explains this process.

First, in step 3-6, the pitch alteration width data presently stored in the RAM 14 is temporarily moved in an A register AR of the CPU 1, and it is discriminated in step 3-7 whether or not the data in the A register AR is greater than or equal to 11. According to this embodiment, it is assumed that no trill performance with a pitch difference of above one octave is carried out, so that it is discriminated whether or not the stored pitch alteration width data is within *+ 11 that indicates the pitch difference being within one octave. If YES, which means that no increase of the pitch alteration width is possible, it is invalid to turn on the pitch-up switch 13-1 any more. Consequently, "1" is set to the pitch-up flag UF to indicate that the switch 13-1 is ON in step 3-8 without writing pitch alteration width data in the RAM 14, and the flow returns to the main routine. If the decision in step 3-7 is NO, it is necessary to cope with the event that the pitch-up switch 13-1 is newly turned on once, so that the pitch alteration width data in the A register AR is incremented by one in step 3-9. In the next step 3-10, data "+1" indicating that the pitch is higher by a half tone than the pitch alteration width data previously written in the A register AR, is newly written as pitch alteration width data in the RAM 14. Then, the pitch-up flag UF is set with "1" in step 3-8 and the flow returns to the main routine, as per the case where the decision in step 3-7 was YES.

In this manner, every time the pitch-up switch 13-1 is turned on once by the operation of the CPU 1, the pitch alteration width data of +1 is added to the previous pitch alteration width data in the RAM 14 which serves as the pitch alteration width memory. For instance, in a case where the initial pitch alteration width data of +1 is stored in the RAM 14 by throwing on the power or by simultaneously operating the pitch-up switch 13-1 and pitch-down switch 13-2, when the pitch alter switch 12 is turned on to start a trill performance, the CPU 1 serving as the pitch alteration control means requests the tone generator 3 to generate a musical tone at the pitch higher by a half tone than the pitch designated by the pitch setting switches 2, in accordance with the pitch alteration width "+1." As a result, a musical tone is generated at the pitch half tone higher than the designated pitch.

When the pitch-up switch 13-1 is turned on once, the operation following the step 3-1 is executed the initial data of the RAM 14 is incremented by one and pitch alteration width of +2 is newly stored in the RAM 14. When the pitch alter switch 12 is turned on under this condition, a command is sent to the tone generator 3 for generation of a musical tone at a pitch higher by half tone pulse half tone (=full tone) than the pitch designated by the pitch setting switches. As a result, the musical tone is generated at a pitch full tone higher than the designated pitch.

If the decision in step 3-1 is NO, it means that the pitch-up switch 13-1 has not been switched on, so that the pitch-up flag UF is set to "0" in the next step 3-11 to indicate the switch 13-1 being in OFF state. In the subsequent step 13-2, it is discriminated whether or not the pitch-down switch 13-2 is turned on. If the decision in this step is NO, it means that no change has been made this time to the ON operation of the pitch alteration width setting switch section 13. Accordingly, it is unnecessary to rewrite the pitch alteration width data in the RAM 14 at all, so that the pitch-down flag DF is set to "0" and the flow returns to the main routine.

If the decision in step 3-12 is YES, it is then discriminated in step 3-14 whether or not the pitch-down flag DF is set to "1". If the decision here is YES, it means that the pitch-down switch 13-2 has been previously turned on, not newly turned on, so that it is unnecessary to rewrite the pitch alteration width data in the RAM 14. The flow therefore returns to the main routine.

If the decision in step 3-14 is NO, however, it means that the pitch-down switch is presently and newly turned on, so that it is necessary to rewrite the pitch alteration width data to specify a pitch lower by 1 (half tone) than the presently-designated pitch in the trill performance. Consequently, the pitch alteration width data presently stored in the RAM 14 is latched in the A register AR in step 3-15, and it is then discriminated in the next step 3-16 whether or not the pitch alteration width data in the A register AR is equal to or less than −11. If the decision in this step is YES, it means that the pitch-down function does not work any further. It is therefore insignificant to turn on the pitch-down switch 13-2, so that the pitch-down flag DF is set to "1" in step 3-19 to indicate the switch 13-2 being in ON state and the flow returns to the main routine.

If the decision in step 3-16 is NO, it means that the pitch alteration width data in the RAM 14 should be newly decremented. Accordingly, the pitch alteration width data presently latched in the A register AR is decremented by 1 and the resultant data is returned to the A register AR in step 3-17. The new pitch alteration width data in the A register AR is stored in the RAM 14 in the next step 3-18. After the pitch-down flag DF is set to "1" in step 3-19 to indicate the pitch-down switch 13-2 being in ON state, the flow returns to the main routine.

In this manner, every time the pitch-down switch 13-2 is turned ON, the pitch alteration width data stored in the RAM 14 can be decremented by 1 until −11. Therefore, when the pitch-down switch 13-2 is turned 0N once with the pitch alteration width data in the RAM 14 being the initial value (i.e., +1), for example, the data in the RAM 14 becomes *+0 which provides the same pitch as is designated by the pitch setting switches 2. When the pitch-down switch 13-2 is further operated once, the pitch alteration width data in the RAM 14 becomes −1, which means that the data in the RAM 14 indicates a pitch half tone lower than the pitch designated by the pitch setting switches 2. This ensures a trill performance with a pitch lower by half tone than the presently-designated pitch. When the pitch-down switch 13-2 is further operated twice successively, for example, pitch alteration width data specifying a pitch full tone lower than the pitch designated by the switches 2 is stored in the RAM 14. In this case, therefore, it is possible to conduct a trill performance with a pitch lower by a full tone than the presently designated pitch.

According to the above embodiment, provided that arbitrary pitch alteration width data within a range of one octave is stored in advance in the pitch alteration width memory (RAM) 14 by operating the pitch-up switch 13-1 or pitch-down switch 13-2, if a player turns on the pitch alter switch 12 under that condition, the pitch designated by the pitch setting switches 2 can be changed in accordance with the pitch alteration width data stored in the RAM 14. Under the circumstance that a predetermined pitch is designated by the pitch setting switches 2, it is possible to easily carry out a trill performance with a pitch higher or lower than the designated pitch by a predetermined pitch difference by repeating the ON operation or OFF operation of the pitch alter switch 12 in the proper time interval.

Since the pitch alteration width display 20 is provided as shown in FIG. 1 to display the pitch alteration width data presently stored in the RAM 14, the player can visually confirm the present pitch alteration width. This can facilitate conductance of a trill performance.

MODIFICATIONS

Although the pitch alteration width data that can be set by the pitch-up switch 13-1 and pitch-down switch 13-2 is restricted to be within one octave according to the above embodiment, this invention is in no way limited to this particular case. A modification may be made to permit storage of pitch alteration width data in a range of several octaves.

Although the pitch alteration width data can merely be set in the units of a half tone according to the above embodiment, this data may be set more finely, for example, in the units of cent. Further, a trill performance may be carried out with the pitch alteration being restricted to either increasing or decreasing the pitch designated by the pitch setting switches 2.

According to the above-described embodiment, one pitch alter switch 12 is provided and the presently-designated pitch is altered simply in accordance with one set of pitch alteration width data from the RAM 14 by the ON operation of this pitch alter switch 12. A plurality of pitch alter switches 12, **12*a*, 12*b*, ... may be provided as shown in FIG. 1 and different pitch alteration width data associated with the individual pitch alter switches may be stored in advance in the RAM 14, so that a variety of trill performances can be carried out in accordance with different pitch alteration width data by properly and selectively performing the ON operation of these pitch alter switches 12, 12*a*, 12*b***, ....

Further, according to the above embodiment, when a breath operation is performed on the mouth section 4 under the condition that a predetermined pitch is designated by the pitch setting switches 2, a predetermined musical tone is generated with the designated pitch, and when the pitch alter switch 12 is turned on during generation of a predetermined musical tone at the designated pitch through a breath operation, the predetermined musical tone is generated at a different pitch according to the pitch alteration width data stored in the RAM 14. This invention is in no way limited to this particular design. For example, a modification may be made in such a way that when a pitch designating operation is performed on the pitch setting switches 2, a predetermined musical tone is generated at the pitch designated by this operation, and when a pitch alteration designating operation is performed on the pitch alter switch 12, a predetermined musical tone is generated at a different pitch according to the pitch alteration width data stored in the RAM 14.

Although the above description of the embodiment has been given with reference to the case where the present invention is applied to an electronic wind instrument, this invention is not restricted to this particular case and may be applied to other electronic musical instrument, such as an electronic keyboard instrument or an electronic string instrument. If this invention is applied to an electronic string instrument, however, the instrument may be designed in such a way that with a predetermined pitch being designated by performing a pitch designating operation with respect to a finger board, a predetermined musical tone is generated at the designated pitch by finger or picking desired strings stretched over the body section of the instrument, and the predetermined musical tone is generated at a pitch altered from the designated pitch in accordance with the pitch alteration width data stored in advance in a RAM, by turning on a pitch alter switch.

What is claimed is:

1. An electronic musical instrument, comprising:

pitch designating means for permitting designation of a pitch designated by a pitch designating operation;

pitch alteration designating means including trill designating means for designating alteration of a pitch designed by said pitch designating means to execute a trill performance;

pitch alteration width programming means for manually programming an alternation width of a pitch to be altered by said pitch alteration designating means;

pitch alteration width memory means for storing pitch alteration width data designated by said pitch alteration width programming means; and pitch alteration control means for, when pitch alteration is designated by said trill designating means under a condition that a predetermined pitch is designated by said pitch designating means, executing such a control that said pitch designated by said pitch designating means is altered to another corresponding pitch in accordance with said pitch alteration width data stored in said pitch alteration width memory means.

2. The apparatus according to claim 1, further comprising tone generating means for, when a pitch designating operation is performed on said pitch designating means, generating a predetermined musical tone at a pitch designated by said pitch designating operation, and for, when a pitch alteration designating operation is performed on said trill designating means, generating a predetermined musical tone at a different pitch according to said pitch alteration width data stored in said pitch alteration width memory means.

3. The apparatus according to claim 1, further comprising play input means for detecting a state of a play input operation and for selecting a pitch designated by said pitch designating means in response to said play input operation.

4. The apparatus according to claim 3, further comprising tone generating means for, when a play input operation is performed on said play input means under a condition that a pitch is designated by said pitch designating means, generating a predetermined musical tone at said designated pitch, and for, when a pitch alteration operation is performed on said trill designating means during generation of a predetermined musical tone at said designated pitch, generating a predetermined musical tone at another pitch according to said pitch alteration width data stored in said pitch alteration width memory means.

5. The apparatus according to claim 3, wherein said play input means is breath sensor means for detecting a breath operating state.

6. The apparatus according to claim 3, wherein said play input means is a string operation sensor means for detecting a string operation state.

7. The apparatus according to claim 3, wherein said pitch designating means, said play input means and said tone generating means are provided at a musical instrument main body.

8. The apparatus according to claim 4, wherein said pitch designating means, said play input means and said tone generating means are provided at a musical instrument main body.

9. The apparatus according to claim 1, further comprising pitch alteration width data display for, when alteration with of a predetermined pitch is designated by said pitch alteration width designating means, displaying pitch alteration width data corresponding to said alteration width.

10. The apparatus according to claim 1, wherein said pitch alteration width programming means uses a half tone unit or a cent unit as a minimum unit to be used to program a pitch alteration width.

11. The apparatus according to claim 1, wherein said trill designating means designates alteration of a pitch designated by said pitch designating means to a higher pitch or a lower pitch.

12. The apparatus according to claim 11, wherein there are a plurality of said trill designating means.

13. The apparatus according to claim 12, wherein one of said plurality of said trill designating means designates alteration of said pitch to a higher pitch while the other trill designating means designates alteration of said pitch to a lower pitch.

14. The apparatus according to claim 13, wherein when said one of said trill designating means and said other trill designating means are simultaneously operated, it is designated to alter said pitch designated by said pitch designating means to a pitch higher by a half tone.

* * * * *